(12) United States Patent
Nelam et al.

(10) Patent No.: US 10,332,277 B2
(45) Date of Patent: Jun. 25, 2019

(54) LOW COMPLEXITY OPTIMAL DECIMATION GRID SELECTION IN ENCODING APPLICATIONS

(71) Applicant: SAMSUNG ELECTRONICS CO., LTD., Suwon-si, Gyeonggi-Do (KR)

(72) Inventors: Praveen Kumar Nelam, Bangalore (IN); Srinivas Reddy Eregala, Telangana (IN); Devendran Mani, Tamil Nadu (IN)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/097,309

(22) Filed: Apr. 13, 2016

(65) Prior Publication Data

US 2017/0301112 A1 Oct. 19, 2017

(51) Int. Cl.
*G06T 9/00* (2006.01)
*H04N 19/00* (2014.01)
*H04N 19/42* (2014.01)

(52) U.S. Cl.
CPC .............. *G06T 9/00* (2013.01); *H04N 19/42* (2014.11)

(58) Field of Classification Search
CPC .................................... G06T 9/00; H04N 7/50
USPC .................................................. 382/166, 232
See application file for complete search history.

(56) References Cited

U.S. PATENT DOCUMENTS

| | | | |
|---|---|---|---|
| 5,204,920 A | | 4/1993 | Moran et al. |
| 5,991,454 A | * | 11/1999 | Fowler ................. G01S 1/04 382/239 |
| 6,157,743 A | | 12/2000 | Goris et al. |
| 7,606,435 B1 | | 10/2009 | Dumitras et al. |
| 7,885,469 B2 | | 2/2011 | Wang et al. |
| 2007/0018994 A1 | | 1/2007 | Sekine |
| 2008/0002895 A1 | | 1/2008 | Flavell et al. |
| 2014/0023287 A1 | * | 1/2014 | Strom ................. G06T 9/004 382/243 |
| 2014/0161306 A1 | * | 6/2014 | Ma ..................... G06K 9/3233 382/103 |
| 2014/0193081 A1 | * | 7/2014 | Nystad ................. H04N 19/90 382/197 |
| 2015/0119721 A1 | * | 4/2015 | Pedersen ............. A61B 5/445 600/476 |

FOREIGN PATENT DOCUMENTS

WO WO2012133469 A1 10/2012

* cited by examiner

*Primary Examiner* — Yi Yang (74) *Attorney, Agent, or Firm* — Volentine, Whitt & Francos, PLLC (57) ABSTRACT

A method, executed by an encoding circuit, for selecting an optimal decimated grid includes estimating, among a plurality of decimated grids within a coded block, a weight decimation error for each of a vertical decimated grid and a horizontal decimated grid. A weight decimation error is estimated for each of remaining decimated grids among the plurality of decimated grids based on a corresponding weight decimation error among the vertical decimated grid and the horizontal decimated grid. For each of the plurality of decimated grids, an initial combined error is determined by combining the weight decimation error and a color format choice error. Two decimated grids having the least initial combined errors, among the plurality of decimated grids, are selected as optimal decimated grids.

18 Claims, 5 Drawing Sheets

8x8 coding block

| NA | NA | NA | NA | NA | NA | NA | NA |
|---|---|---|---|---|---|---|---|
| NA | NA | NA | 2x4 | 2x5 | 2x6 | NA | 2x8 |
| NA | NA | NA | 3x4 | 3x5 | 3x6 | NA | 3x8 |
| NA | 4x2 | 4x3 | 4x4 | 4x5 | 4x6 | NA | 4x8 |
| NA | 5x2 | 5x3 | 5x4 | 5x5 | 5x6 | NA | 5x8 |
| NA | 6x2 | 6x3 | 6x4 | 6x5 | 6x6 | NA | 6x8 |
| NA | 7x2 | 7x3 | 7x4 | 7x5 | 7x6 | 7x7 | 7x8 |
| NA | 8x2 | 8x3 | 8x4 | 8x5 | 8x6 | 8x7 | 8x8 |

LOW COMPLEXITY OPTIMAL DECIMATION GRID SELECTION IN ENCODING APPLICATIONS

TECHNICAL FIELD

The present disclosure relates to encoding applications, and more particularly, to a mechanism for selecting an optimal decimation grid in an advanced scalable texture compression (ASTC) encoding application.

BACKGROUND

Generally, in image compression, an uncompressed image is processed to obtain a compressed image. The image processing includes application of one or more algorithms to the uncompressed image. As an example, one such algorithm for image compression is joint photographic experts group (JPEG).

One type of image is called a texture map or a texture. A texture map is an image that is applicable to a surface of a two-dimensional or three-dimensional object (for example, an object that is represented in a virtual space by a wireframe model that includes one or more polygons). Similar to images, texture maps are compressed using one or more image compression techniques to obtain compressed textures which are easily stored in a database or quickly communicated over a network. Advanced scalable texture compression (ASTC) is a standard compression technique and is predominantly used for texture compression.

It is common in computer graphics systems to generate colors for sampling positions in an image to be displayed by applying textures or texture data to the surfaces to be drawn. For example, surface detail on objects may be generated by applying a predefined "texture" to a set of graphics primitives (such as polygons) representing the object, to give the rendered image of the object the appearance of the texture. Such textures are typically applied by storing an array of texture elements or "texels," each representing given texture data (such as color, luminance, or light/shadow values) at a given location (i.e., position), and then mapping the texels onto the corresponding elements, such as a set of sampling positions, for the image to be displayed. The stored arrays of texture elements (i.e., data) are typically referred to as texture maps.

Such arrangements can provide relatively high image quality, but have a number of drawbacks. In particular, the storage of the texture data and accessing it in use can lead to higher storage capacity and processing requirements on a graphics processing device. This is particularly significant for power constrained devices, such as mobile phones and other handheld devices that perform graphics processing, as these devices are inherently limited in their storage, bandwidth, and power resources. It is therefore known to encode such texture data in a compressed form so as to reduce the storage and bandwidth that may be imposed on a graphics processing device when using textures.

Texture compression techniques typically determine a reduced set or palette of colors (or other data) to be used for a given texture map and then store, for each texture element (texel) in the texture map, an index into the set or palette of colors that indicates the color to be used for the texture element. This has the advantage that only an index, rather than a full color, value needs to be stored for each texel. The existing texture compression techniques use block-based encoding, in which the overall array of texture elements to be encoded is divided into an array of small blocks (such as blocks of 4×4 texels or 8×8 texels), with each such block then encoded (compressed), and decoded, separately. This can help to make the decoding process more efficient, because the decoder, for example, may need to decode only one or a few of the encoded blocks to determine the value of a texel of interest, rather than the entire encoded texture.

In the conventional mechanisms, the ASTC compression is an offline encoding system. The ASTC encoder is a block-based, texture compression standard. In an ASTC coder/decoder (codec), all texels of a block are represented using color endpoints and weights, which is compressed to a pre-defined 128 bits with best possible quality. In the current smart phone or tablet market, there are real time ASTC decoders to provide a user with a differentiating gaming experience. In the gaming ecosystem, the need for an ASTC encoder is not much prevalent. But to deploy the ASTC compression for the imaging compression context, leads to the desirability of a real-time ASTC encoder. In an ASTC encoder, a block mode selection follows a complex and an iterative approach, which is not a viable solution for real-time encoding applications. The block mode selection algorithm is described below.

A best block mode and color endpoint mode (CEM) are selected based on predefined 128 bits and Min (Weight error [NB]+Color format choice error [CF] criteria), where NB=0, 1, 2, 3 . . . number of blocks and CF=0, 1, 2, 3 . . . number of color formats, weight error=(weight decimation error+ weight quantization error), which can fit into predefined 128 bits.

There is a need in the art to provide a low-complexity block-mode selection method to handle real-time encoding applications.

SUMMARY

Accordingly, the embodiments herein provide a method, executed by an encoding circuit, for selecting an optimal decimated grid. The method includes estimating, among a plurality of decimated grids within a coded block, a weight decimation error for each of a vertical decimated grid and a horizontal decimated grid. A weight decimation error is estimated for each of remaining decimated grids among the plurality of decimated grids based on a corresponding weight decimation error among the vertical decimated grid and the horizontal decimated grid. For each of the plurality of decimated grids, an initial combined error is determined by combining the weight decimation error and a color format choice error. Two decimated grids having the least initial combined errors, among the plurality of decimated grids, are selected as optimal decimated grids.

The embodiments herein also provide an encoder for selecting an optimal decimated grid. The encoder includes a decimated weight and quantization estimation circuit that estimates, among a plurality of decimated grids within a coded block, a weight decimation error for each of a vertical decimated grid and a horizontal decimated grid. A weight decimation error is estimated for each of remaining decimated grids, among the plurality of decimated grids, based on a corresponding weight decimation error among the vertical decimated grid and the horizontal decimated grid. For each of the decimated grids, an initial combined error is determined by combining the weight decimation error and a color format choice error. Two decimated grids having the minimum initial combined errors, among the plurality of decimated grids, are selected as optimal decimated grids.

The embodiments herein provide a method, executed by an encoder circuit, for selecting an optimal decimated grid.

The method includes estimating, with a decimated weight and quantization estimation circuit, a weight decimation error for each of a vertical decimated grid and a horizontal decimated grid among a plurality of decimated grids. The decimated weight and quantization estimation circuit estimates a weight decimation error for each of remaining decimated grids, among the plurality of decimated grids, based on a corresponding weight decimation error among the vertical decimated grid and the horizontal decimated grid. The decimated weight and quantization estimation circuit computes a quantization error of each weight quantization level on an ideal weight grid. A color endpoint mode estimation circuit determines a combined error by combining the weight decimation error, a color format choice error, and the quantization error for each the decimated grids. The color endpoint mode estimation circuit selects two optimal color endpoint modes and block modes having the least minimum combined errors, among the decimated grids, as optimal decimated grids.

BRIEF DESCRIPTION OF FIGURES

This disclosure is illustrated in the accompanying drawings, throughout which like reference characters indicate corresponding parts in the various figures. The embodiments herein will be better understood from the following description with reference to the drawings, in which.

DETAILED DESCRIPTION OF DISCLOSURE

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein disclose a method for selecting an optimal decimated grid in an encoder. The method includes estimating a weight decimation error individually for each of a vertical decimated grid and a horizontal decimated grid from a plurality of decimated grids. Further, the method includes estimating a weight decimation error for each of remaining decimated grids, from the plurality of decimated grids, based on a corresponding weight decimation error of the vertical decimated grids and the horizontal decimated grids. Further, the method includes determining an initial combined error by combining the weight decimation error and a color format choice error individually for each of the decimated grids. Further, the method includes selecting at least two decimated grids, from the plurality of decimated grids, having a minimum initial combined error as optimal decimated grids.

In an embodiment, the method further includes determining an actual weight decimation error and a quantization error for each of the optimal decimated grids. Further, the method includes determining a final combined error by combining the actual weight decimation error, the quantization error and the color format choice error. Further, the method includes estimating optimal color endpoint modes and block modes for each of the optimal decimated grids, having a minimum final combined error. Further, the method includes selecting an optimal color endpoint mode and a block mode, from the optimal color endpoint modes and the block modes, having a minimum reconstruction error.

In an embodiment, the encoder is an Adaptive Scalable Texture Compression (ASTC) encoder.

Another embodiment herein discloses a method for selecting the optimal decimated grid in the encoder. The method includes estimating the weight decimation error individually for each of the vertical decimated grid and the horizontal decimated grid from the plurality of decimated grids. Further, the method includes estimating a weight decimation error for each of remaining decimated grids from the plurality of decimated grids based on corresponding weight decimation error of the vertical decimated grid and the horizontal decimated grid. Further, the method includes computing a quantization error of each weight quantization level on an ideal weight grid. Further, the method includes determining a combined error by combining the weight decimation error, the color format choice error, and the quantization error for each of the decimated grids. Further, the method includes selecting at least two optimal color endpoint modes and block modes, from the decimated grids, having the minimum combined error as optimal decimated grids.

In an embodiment, the method further includes selecting the optimal color endpoint mode and a block mode, from the optimal decimated grids, having the minimum reconstruction error.

In conventional systems, the ASTC encoder follows an iterative approach to select the best block mode. For selecting the best block mode, the below described steps are iteratively performed for all possible decimated weight grid sizes and weight quantization levels:

a. Computing decimated weights from original weights,
 b. Quantizing and un-quantizing the decimated weights for a particular weight quantization level,
 c. Infilling the un-quantized and decimated weights to an original block size,
 d. Computing a sum of scaled absolute difference errors (i.e., weight error) between infill weights and original weights, and
 e. Selecting the best block mode with a minimum combined error, where the combined error includes both the weight error and color format choice.

Unlike the conventional systems and methods, the disclosure herein provides a low complexity block mode selection approach targeted for high-performance encoding applications. The disclosed method eliminates computation of the decimated weights for all the decimated grids, which is a very complex process. Further, the proposed method eliminates the need to quantize the decimated weights with all quantization levels and for all decimated grids; and eliminates infilling of the decimated weights to original block size for all decimated grids. With increasing block sizes (i.e., from 4×4 to 12×12 as per ASTC specification), the proposed method is more advantageous where the complexity is reduced significantly in the best block mode selection for a given block size.

Referring now to the drawings, and more particularly to FIGS. 1 through 5, where similar reference characters denote corresponding features consistently throughout the figures, there are shown preferred embodiments.

Figure 1:
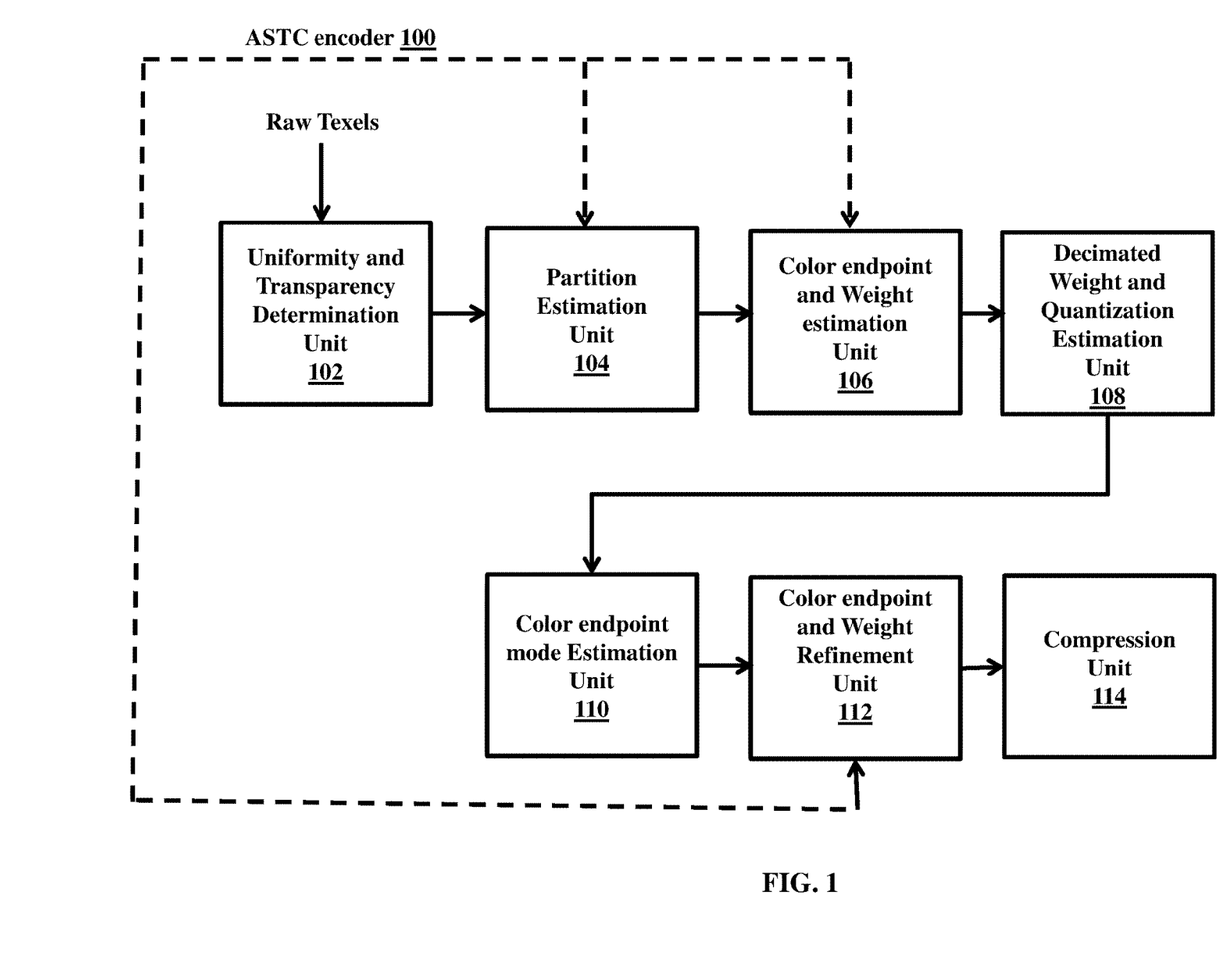
FIG. 1 illustrates a block diagram of an advanced scalable texture compression (ASTC) encoder for selecting an optimal decimated grid, according to an embodiment as disclosed herein.

FIG. 1 illustrates a block diagram of an Adaptive Scalable Texture Compression (ASTC) encoder for selecting an optimal decimated grid, according to an embodiment disclosed herein. ASTC encoder 100 includes a uniformity and transparency determination unit 102, a partition estimation unit 104, a color endpoint and weight estimation unit 106, a decimated weight and quantization estimation unit 108, a color endpoint mode estimation unit 110, a color endpoint and weight refinement unit 112, and a compression unit 114.

Raw image data, which is a texture map, is provided as an input to the uniformity and transparency determination unit 102. The uniformity and transparency determination unit 102 checks for uniformity of texels in the raw image data. If all texels have constant color, then the uniformity and transparency determination unit 102 sets an IsVoidExtent flag to "ON". Further, the uniformity and transparency determination unit 102 bypasses all the units to encode the block in the compression unit 114. Further, if IsVoidExtent equals to zero, then the uniformity and transparency determination unit 102 sends the texels in the raw image to the partition estimation unit 104.

The partition estimation unit 104 identifies the best partition pattern for a given block footprint. There are a maximum of 1024 predefined partition patterns for a given block footprint as specified in the ASTC standard. Further, the partition estimation unit 104 applies a K-Mean clustering algorithm to group block texels into different partitions. Then, the extracted partition pattern from the K-means clustering is compared to pre-defined partition patterns to select 'N' number of best partition patterns. Finally, the partition estimation unit 104 selects a partition pattern with the least partition error.

The color endpoint and weight estimation unit 106 selects a block mode for encoding. The texture map is divided into blocks of size, for example, "12×12", "8×8", "4×4", or the like. The selected block mode for encoding is known as the coded block. For each partition of texels, the color endpoint and weight estimation unit 106 computes ideal color endpoints and texel weights. Further, the color endpoint and weight estimation unit 106 selects an "N×N" block for encoding and sends the "N×N" block to the decimated weight estimation unit 108. In an embodiment, the "N×N" block includes a plurality of grids. In an example, the color endpoint and weight estimation unit 106 selects a "12×12" block for encoding. In another example, the color endpoint and weight estimation unit 106 selects an "8×8" block for encoding. In another example, the color endpoint and weight estimation unit 106 selects a "4×4" block for encoding.

After receiving the "N×N" block for encoding, the decimated weight and quantization estimation unit 108 can be configured to estimate a weight decimation error individually for each of a vertically decimated grid and a horizontal decimated grid from a plurality of decimated grids. Further, the decimated weight and quantization estimation unit 108 can be configured to estimate a weight decimation error for each of remaining decimated grids among the plurality of decimated grids based on a corresponding weight decimation error of the vertical decimated grid and the horizontal decimated grid. Further, the decimated weight and quantization estimation unit 108 can be configured to determine an initial combined error by combining the weight decimation error and a color format choice error individually for each of the decimated grids.

In an embodiment, after estimating the weight decimation error for the plurality of decimated grids, the decimated weight and quantization estimation unit 108 can be configured to select at least two best possible combinations with a minimum initial combined error as the optimal decimated grids.

For the selected at least two decimated grids, the decimated weight and quantization estimation unit 108 can be configured to determine an actual weight decimation error and a quantization error for each of the decimated grids. Further, the decimated weight and quantization estimation unit 108 can be configured to send the determined actual weight decimation error and quantization error to the color endpoint mode estimation unit 110. The color endpoint mode estimation unit 110 can be configured to determine a final combined error by combining the actual weight decimation error, the quantization error, and color format choice error. Further, the color endpoint mode estimation unit 110 can be configured to estimate optimal color endpoint modes and block modes for each of the optimal decimated grids, having a minimum final combined error. Further, the color endpoint and weight refinement unit 112 can be configured to select an optimal color endpoint mode and a block mode, from the optimal color endpoint modes and the block modes, having a minimum reconstruction error. The reconstruction error is obtained by performing a decoding process on the optimal color endpoint mode and the block mode. In the decoding process, reconstruction of all blocks texels is accomplished by interpolation of un-quantized and in-filled decimated weights and un-quantized color endpoints. The reconstruction error is computed between the reconstructed texels and original source texels. The color endpoint and weight refinement unit 112 determines the minimal reconstruction error by using conventional mechanisms. The best block mode is selected such that compressed block bits should fit into a fixed-number of 128 bits, with best possible quality and with minimum reconstruction error.

In an example, when the color endpoint and weight estimation unit 106 selects "8×8" block for encoding, then the decimated weight and quantization estimation unit 108 can be configured to obtain the decimated weight estimate as "5×6" block. The decimated weight estimate "5×6" block is a subset of an "8×8" block.

In another embodiment, the decimated weight and quantization estimation unit 108 can be configured to compute the quantization error of each weight quantization level (i.e., 0 to 11) on an ideal weight grid (i.e., without decimation). Further, the color endpoint mode estimation unit 110 can be configured to select the at least two optimal color endpoint modes and block modes, from the optimal decimated grids, having the minimum final combined error by combining weight decimation error, the color format choice error, and the weight quantization error as the optimal decimated grids. Further, the color endpoint and weight refinement unit 112 can be configured to select an optimal color endpoint mode and a block mode, from the optimal decimated grids, having a minimum reconstruction error.

The color endpoint mode estimation unit 110 selects at least two best color endpoint modes (CEM) & block modes based on a pre-defined 128-bits and Min (Weight error [NB]+Color format choice error [CF]) criteria, where NB=0, 1, 2, 3 . . . number of blocks and CF=0, 1, 2, 3 . . . number of color formats, weight error=(weight decimation error+ weight quantization error).

The color endpoint and weight refinement unit 112 identifies an efficient sampling in the ASTC encoder 100. The identification of the efficient sampling point is performed at a final operational stage of the color endpoint and weight refinement unit 112. This selection criteria is compressed information of a selected combination and should be fit into a fixed 128-bits with the best possible quality out of selected at least two combinations of block mode and color endpoint modes (CEM) for each block.

The Compression unit 114 finally packs quantized weight, quantized color endpoint data and block level control information like block mode, partition information, and CEM configuration to form 128-bit compressed data.

FIG. 1 shows a limited overview of the ASTC encoder 100 but, it is to be understood that other embodiments are not limited thereto. Further, the ASTC encoder 100 can include any number of units communicating among each other.

Figure 2:
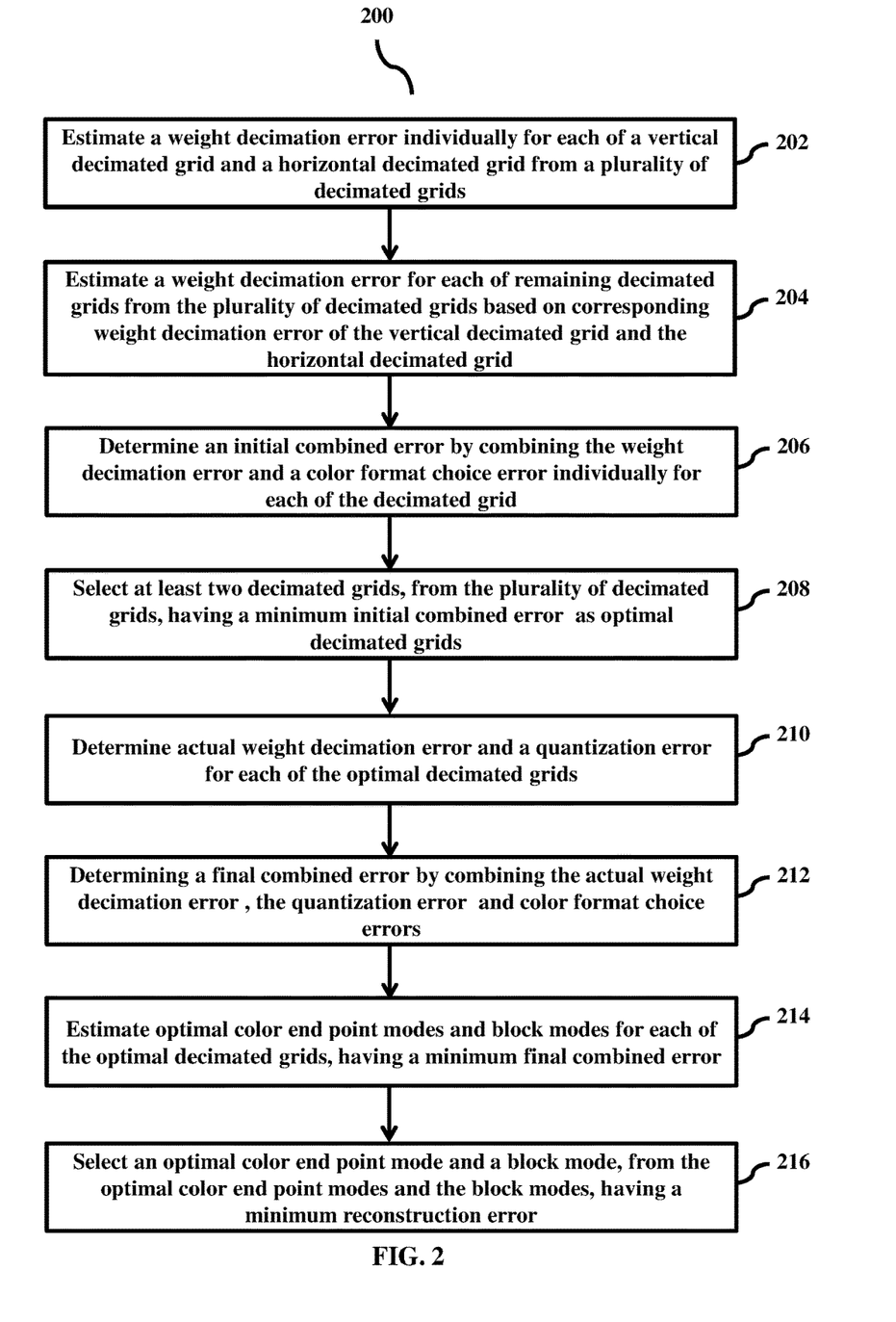
FIG. 2 is a flow diagram illustrating a method for selecting an optimal color endpoint mode and a block mode, according to an embodiment as disclosed herein.

FIG. 2 is a flow diagram illustrating a method 200 for selecting the optimal color endpoint mode and a block mode, according to an embodiment as disclosed herein. At step 202, the method 200 includes estimating a weight decimation error individually for each of a vertical decimated grid and a horizontal decimated grid from a plurality of decimated grids. The method 200 allows the decimated weight and quantization estimation unit 108 to estimate the weight decimation error individually for each of the vertical decimated grid and the horizontal decimated grid from the plurality of decimated grids.

At step 204, the method 200 includes estimating a weight decimation error for each of the remaining decimated grids among the plurality of decimated grids based on a corresponding weight decimation error of the vertical decimated grid and the horizontal decimated grid. The method 200 allows the decimated weight and quantization estimation unit 108 to estimate the weight decimation error for each of the remaining decimated grids among the plurality of decimated grids based on the corresponding weight decimation error of the vertical decimated grid and the horizontal decimated grid.

At step 206, the method 200 includes determining a combined error by combining the weight decimation error and a color format choice error individually for each of the decimated grids. The method 200 allows the decimated weight and quantization estimation unit 108 to determine the combined error by combining the weight decimation error and the color format choice error individually for each of the decimated grids.

At step 208, the method 200 includes selecting at least two decimated grids, from the plurality of decimated grids, having the minimum combined error as optimal decimated grids. The method 200 allows the decimated weight and quantization estimation unit 108 to select the at least two decimated grids, from the plurality of decimated grids, having the minimum combined error as the optimal decimated grids.

At step 210, the method 200 determines an actual weight decimation error and a quantization error for each of the optimal decimated grids. The method 200 allows the decimated weight and quantization estimation unit 108 to determine the actual weight decimation error and the quantization error for each of the optimal decimated grid. At step 212, the method 200 includes determining a final combined error by combining the actual weight decimation error, the quantization error, and a color format choice error. The method 200 allows the color endpoint mode estimation unit 110 to determine the final combined error by combining the actual weight decimation error, the quantization error, and the color format choice errors.

At step 214, the method 200 includes estimating optimal color endpoint modes and block modes (i.e., decimated grid and quantization level) for each of the optimal decimated grids. The method 200 allows the color endpoint mode estimation unit 110 to estimate the optimal color endpoint modes and the block modes (i.e., decimated grid and quantization level) for each of the optimal decimated grids. At step 216, the method 200 includes selecting an optimal color endpoint mode and the block mode, from the optimal color endpoint modes and the block modes, having the minimum reconstruction error. The method 200 allows the color endpoint and weight refinement unit 112 to select the optimal color endpoint mode and the block mode, from the optimal color endpoint modes and the block modes, having the minimum reconstruction error. Further, the example scenario of an "8×8" block footprint is explained in conjunction with the FIG. 4.

The various actions, acts, blocks, steps, or the like in the method 200 may be performed in the order presented, in a different order or simultaneously. Further, in some embodiments, some of the actions, acts, blocks, steps, or the like may be omitted, added, modified, skipped, or the like without departing from the scope of the disclosure.

Figure 3:
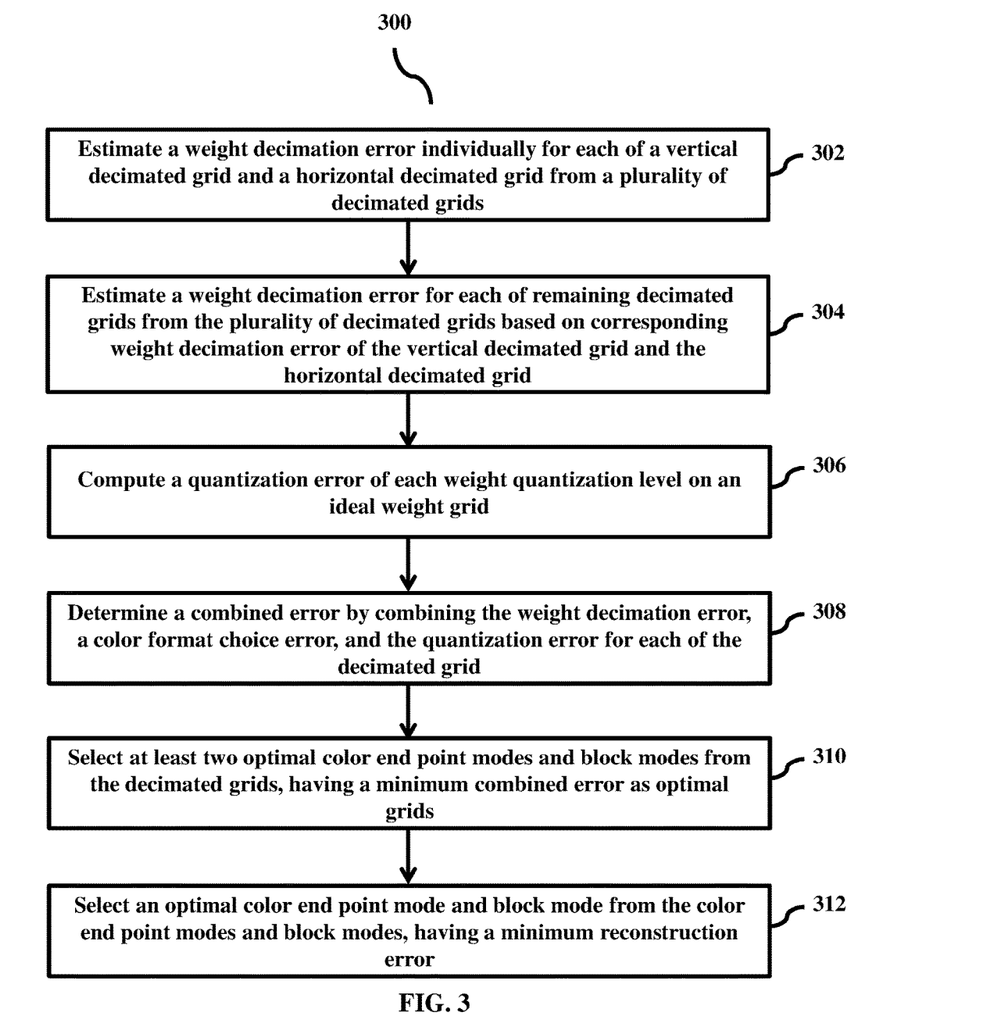
FIG. 3 is a flow diagram illustrating another method for selecting an optimal color endpoint mode and a block mode, according to an embodiment as disclosed herein.

FIG. 3 is another flow diagram illustrating a method 300 for selecting a color endpoint mode and a block mode, according to an embodiment as disclosed herein. At step 302, the method 300 includes estimating a weight decimation error individually for each of a vertical decimated grid and a horizontal decimated grid from a plurality of decimated grids. The method 300 allows the decimated weight and quantization estimation unit 108 to estimate the weight decimation error individually for each of the vertical decimated grid and the horizontal decimated grid from the plurality of decimated grids.

At step 304, the method 300 includes estimating a weight decimation error for each of the remaining decimated grids among the plurality of decimated grids based on a corresponding weight decimation error of the vertical decimated grid and the horizontal decimated grid. The method 300 allows the decimated weight and quantization estimation unit 108 to estimate the weight decimation error for each of the remaining decimated grids among the plurality of decimated grids based on corresponding weight decimation error of the vertical decimated grid and the horizontal decimated grid.

At step 306, the method 300 includes computing a quantization error of each weight quantization level on an ideal weight grid. The method 300 allows the decimated weight and quantization estimation unit 108 to compute the quantization error of each weight quantization level on the ideal weight grid. At step 308, the method 300 includes determining a combined error by combining the weight decimation error, a color format choice error, and the quantization error for each of the decimated grids. The method 300 allows the color endpoint mode estimation unit 110 to determine the combined error by combining the weight decimation error, the color format choice error, and the quantization error for each of the decimated grid.

At step 310, the method 300 includes selecting at least two optimal color endpoint modes and block modes, from the decimated grids, having a minimum combined error as optimal decimated grids. The method 300 allows the color endpoint mode estimation unit 110 to select the at least two optimal color endpoint modes and the block modes, from the decimated grids, having the minimum combined error as the optimal decimated grids. At step 312, the method 300 includes selecting an optimal color endpoint mode and a block mode, from the optimal decimated grids, having a minimum reconstruction error as the optimum decimated grid. The method 300 allows the color endpoint and weight refinement unit 112 to select the optimal decimated grid, from the optimal decimated grids, having the minimum reconstruction error. Further, an example scenario of an "8×8" block footprint is explained in conjunction with the FIG. 4.

The various actions, acts, blocks, steps, or the like in the method 300 may be performed in the order presented, in a different order, or simultaneously. Further, in some embodiments, some of the actions, acts, blocks, steps, or the like may be omitted, added, modified, skipped, or the like without departing from the scope of the disclosure.

Figure 4:
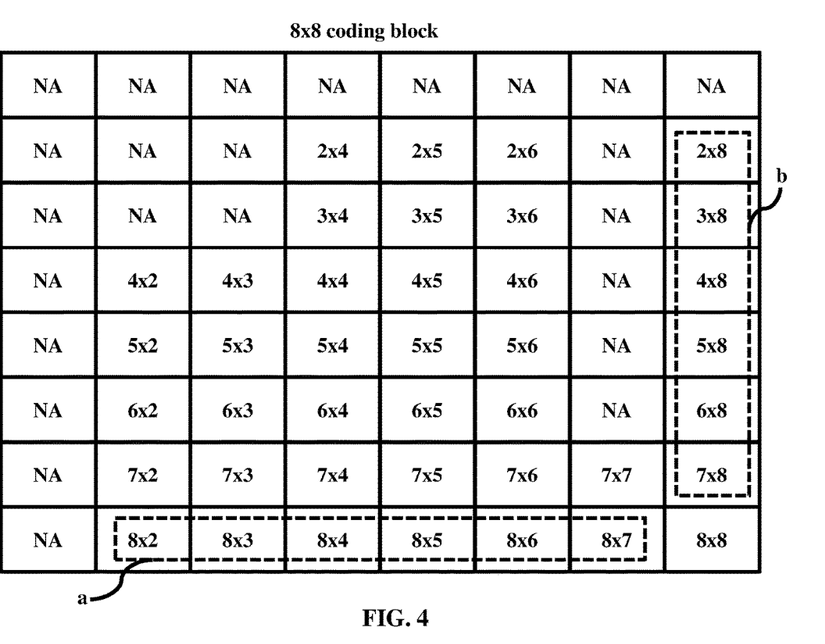
FIG. 4 illustrates an example scenario for selecting the optimal decimated grid from an "8×8" block footprint, according to an embodiment as disclosed herein.

FIG. 4 illustrates an example scenario for selecting an optimal decimated grid from an "8×8" block footprint, according to an embodiment disclosed herein. FIG. 4 shows an "8×8" block footprint, where notation "a" represents a horizontally decimated grid as shown in Table-1 and notation "b" represents a vertically decimated grid as shown in Table-2.

TABLE 1

| 8 × 2 | 8 × 3 | 8 × 4 | 8 × 5 | 8 × 6 | 8 × 7 |
|-------|-------|-------|-------|-------|-------|

TABLE 2

| 2 × 8 | 3 × 8 | 4 × 8 | 5 × 8 | 6 × 8 | 7 × 8 |
|-------|-------|-------|-------|-------|-------|

Scheme-1: The decimated weight and quantization estimation unit 108 computes a weight decimation error (wdErr) for the vertically decimated grid as shown in Table-3 and a horizontally decimated grid as shown in Table-4.

TABLE 3

| wdErr (8 × 2) | wdErr (8 × 3) | wdErr (8 × 4) | wdErr (8 × 5) | wdErr (8 × 6) | wdErr (8 × 7) |
|---|---|---|---|---|---|

TABLE 4

| wdErr (2 × 8) | wdErr (3 × 8) | wdErr (4 × 8) | wdErr (5 × 8) | wdErr (6 × 8) | wdErr (7 × 8) |
|---|---|---|---|---|---|

Further, the decimated weight and quantization estimation unit 108 can be configured to estimate a weight decimation error for each of remaining decimated grids from a plurality of decimated grids based on a corresponding weight decimation error of the vertical decimated grid and the horizontal decimated grid. For example, for the remaining decimated grid "7×5", the weight decimation error is determined by using the equation:

$$wdErr(7\times5) \approx X_h * wdErr(7\times8) + X_v * wdErr(8\times5),$$

where $X_v$ and $X_h$ are weight factors on error.

Similarly, the remaining decimated grids are also determined. In an embodiment, after estimating the weight decimation error for the decimated grids, the decimated weight and quantization estimation unit 108 can be configured to select at least two best possible combinations (i.e., decimated grids) with a minimum combined error of the weight decimation error and a color format choice error. For the selected at least two (for example, 4) decimated grids, the decimated weight and quantization estimation unit 108 can be configured to determine an actual weight decimation error and a quantization error for each of the at least two decimated grids. Further, the color endpoint mode estimation unit 110 can be configured to determine a final combined error by combining the actual weight decimation error, the quantization error, and the color format choice error.

Further, the color endpoint mode estimation unit 110 can be configured to estimate the optimal color endpoint modes and block modes for each of the optimal decimated grids. Further, the color endpoint and weight refinement unit 112 can be configured to select the optimal color endpoint mode and the block mode (i.e., the decimated grid and the quantization level) having the minimum reconstruction error.

Scheme-2: The decimated weight and quantization estimation unit 108 computes a weight decimation error (wdErr) for a vertically decimated grid as shown in Table-3 and a horizontally decimated grid as shown in Table-4. Further, decimated weight and quantization estimation unit 108 determines a quantization error of all weight quantization levels (i.e., 0 to 11) on an ideal weight grid (i.e., without decimation) as shown in Table-5.

TABLE 5

| $w_qErr$ ($Q_1$) | $w_qErr$ ($Q_2$) | $w_qErr$ ($Q_3$) | — | $w_qErr$ ($Q_{11}$) |
|---|---|---|---|---|

After determining the quantization error, the decimated weight and quantization estimation unit 108 estimates remaining decimated grids from a plurality of grids and the quantization error. For the remaining decimated grid "7×5", for example, the overall weight error is determined by using the below equation:

$$wErr(7\times5) \approx (X_h * wdErr(7\times8) + X_v * wdErr(8\times5)) + wqErr(Q_4),$$

where $X_h$ & $X_v$ are weight factors on error.

Similarly, the remaining decimated grids are also determined. Further, the color endpoint mode estimation mode 110 can be configured to select at least two optimal color endpoint modes and block modes, from the optimal decimated grids, having the minimum final combined error by a combining weight decimation error, a color format choice error, and the weight quantization error as the optimal decimated grids. Further, the color endpoint and weight refinement unit 112 can be configured to select an optimal color endpoint mode and the block mode, from the optimal decimated grids, having the minimum reconstruction error.

In an embodiment, below Table-6 describes a complexity reduction for Method-1 and Method-2 for an "8×8" block foot print.

TABLE 6

| | | | Scheme-1 | | | Scheme-2 | | |
|---|---|---|---|---|---|---|---|---|
| Block footprint | Total valid block modes | Total valid decimated grids | Computed decimated grids | Estimated decimated modes | Quantization & un-quantization | Computed decimated grids | Estimated decimated modes | Quantization & un-quantization |
| 8 × 8 | 555 | 39 | 12 + N | (27 − N) | N * 12 | 12 | 27 | 12 |

Figure 5:
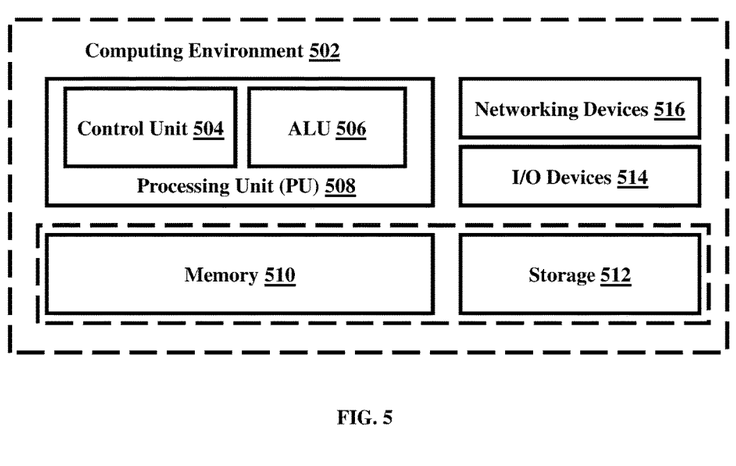
FIG. 5 illustrates a computing environment implementing the method for selecting an optimal decimated grid in an encoder, according to an embodiment as disclosed herein.

FIG. 5 illustrates a computing environment implementing the method for selecting an optimal decimated grid in an encoder, according to the embodiments disclosed herein. As depicted, the computing environment 502 comprises at least one processing unit 508 that is equipped with a control unit 504 and an Arithmetic Logic Unit (ALU) 506, a memory 510, a storage unit 512, plurality of networking devices 516 and a plurality Input output (I/O) devices 514. The processing unit 508 is responsible for processing the instructions of the algorithm. The processing unit 508 receives commands from the control unit 504 in order to perform its processing. Further, any logical and arithmetic operations involved in the execution of the instructions are computed with the help of the ALU 506.

The overall computing environment 502 can be composed of multiple homogeneous and/or heterogeneous cores, multiple CPUs of different kinds, special media and other accelerators. The processing unit 508 is responsible for processing the instructions of the algorithm. Further, the plurality of processing units 508 may be located on a single chip or over multiple chips.

The algorithm comprising instructions and codes required for the implementation are stored in either the memory unit 510 or the storage 512 or both. At the time of execution, the instructions may be fetched from the corresponding memory 510 and/or storage 512, and executed by the processing unit 508.

In case of any hardware implementations, various networking devices 516 or external I/O devices 514 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 and 5 include blocks which can be at least one of a hardware device, or a combination of hardware device and software module.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method, executed by an encoding circuit, for selecting an optimal decimated grid, the method comprising:
    estimating, among a plurality of decimated grids that each uniquely represent a coded block with a reduced set of components of the coded block, a weight decimation error for each of a vertical decimated grid and a horizontal decimated grid;
    estimating a weight decimation error for each of remaining decimated grids among the plurality of decimated grids based on a corresponding weight decimation error among the vertical decimated grid and the horizontal decimated grid;
    determining, for each of the plurality of decimated grids, an initial combined error by combining the weight decimation error and a color format choice error individually for each of the plurality of decimated grids;
    selecting at least two decimated grids having the least initial combined errors, among the plurality of decimated grids, as optimal decimated grids;
    encoding a texture map using the optimal decimated grids having the least initial combined errors;
    determining, for each of the optimal decimated grids, a final combined error;
    estimating optimal color endpoint modes and optimal block modes for each of the optimal decimated grids having the least final combined error;
    selecting an optimal color endpoint mode and block mode from the optimal color endpoint modes and the block modes as a selected optimal color endpoint mode and a selected block mode, and
    forming 128-bit compressed data by packing data of the selected optimal color endpoint mode and the selected block mode, a quantized weight, information of a partition pattern, and a color endpoint mode (CEM)

configuration corresponding to the data of the selected optimal color endpoint mode and the selected block mode.

2. The method of claim 1, further comprising:
determining an actual weight decimation error and a quantization error for each of the optimal decimated grids.

3. The method of claim 2,
wherein the final combined error is determined for each of the optimal decimated grids by combining the actual weight decimation error, the quantization error, and the color format choice error.

4. The method of claim 3,
wherein the selected optimal color endpoint mode and block mode are selected based on having a minimum reconstruction error among the optimal color endpoint modes and the block modes.

5. The method of claim 1, further comprising:
dividing a texture map into the coded block,
wherein the coded block has a grid-size N×N, where N is an integer greater than one.

6. The method of claim 1, further comprising:
selecting the partition pattern, among a plurality of identified partition patterns, having the least partition error.

7. The method of claim 6, further comprising:
applying a K-mean clustering algorithm to group block texels of a texture map into different partitions, and
comparing the different partitions to pre-defined partition patterns to select N best partition patterns as the plurality of identified partition patterns, where N is an integer greater than one.

8. An encoder for selecting an optimal decimated grid, the encoder comprising:
a decimated weight and quantization estimation circuit that:
estimates, among a plurality of decimated grids that each uniquely represent a coded block with a reduced set of components of the coded block, a weight decimation error for each of a vertical decimated grid and a horizontal decimated grid;
estimates a weight decimation error for each of remaining decimated grids, among the plurality of decimated grids, based on a corresponding weight decimation error among the vertical decimated grid and the horizontal decimated grid;
determines, for each of the decimated grids, an initial combined error by combining the weight decimation error and a color format choice error individually for each of the plurality of decimated grids;
selects at least two decimated grids having the least initial combined errors, among the plurality of decimated grids, as optimal decimated grids;
encodes a texture map using the optimal decimated grids having the least initial combined errors;
wherein a final combined error is determined for each of the optimal decimated grids;
optimal color endpoint modes and optimal block modes are estimated for each of the optimal decimated grids having the least final combined error;
an optimal color endpoint mode and block mode is selected from the optimal color endpoint modes and the block modes as a selected optimal color endpoint mode and a selected block mode, and
128-bit compressed data is formed by packing data of the selected optimal color endpoint mode and the selected block mode, a quantized weight, information of a partition pattern, and a color endpoint mode (CEM) configuration corresponding to the data of the selected optimal color endpoint mode and the selected block mode.

9. The encoder of claim 8,
wherein the decimated weight and quantization estimation circuit determines an actual weight decimation error and a quantization error for each of the optimal decimated grids.

10. The encoder of claim 9, further comprising:
a color endpoint mode estimation circuit that:
determines the final combined error for each of the optimal decimated grids by combining the actual weight decimation error, the quantization error, and the color format choice error.

11. The encoder of claim 10, further comprising:
a color endpoint and weight refinement circuit that selects the selected optimal color endpoint mode and the selected block mode, among the optimal color endpoint modes and the optimal block modes, having a minimum reconstruction error.

12. The encoder of claim 11, further comprising:
a compression circuit that forms the 128-bit compressed data.

13. The encoder of claim 8, further comprising:
a color endpoint and weight estimation circuit that divides a texture map into the coded block,
wherein the coded block has a grid-size N×N, where N is an integer greater than one.

14. The encoder of claim 13, further comprising:
a partition estimation circuit that selects a partition pattern, among a plurality of identified partition patterns, having the least partition error.

15. The encoder of claim 14, wherein the partition estimation circuit:
applies a K-mean clustering algorithm to group block texels of a texture map into different partitions, and
compares the different partitions to pre-defined partition patterns to select N best partition patterns as the plurality of identified partition patterns, where N is an integer greater than one.

16. A method, executed by an encoder circuit, for selecting an optimal decimated grid, the method comprising:
estimating, with a decimated weight and quantization estimation circuit, a weight decimation error for each of a vertical decimated grid and a horizontal decimated grid among a plurality of decimated grids that each uniquely represent a coded block with a reduced set of components of the coded block;
estimating, with the decimated weight and quantization estimation circuit, a weight decimation error for each of remaining decimated grids, among the plurality of decimated grids, based on a corresponding weight decimation error among the vertical decimated grid and the horizontal decimated grid;
computing, with the decimated weight and quantization estimation circuit, a quantization error of each weight quantization level on an ideal weight grid;
determining, with a color endpoint mode estimation circuit, for each of at least two selected optimal decimated grids, a combined error by combining the weight decimation error, a color format choice error, and the quantization error for each of the selected optimal decimated grids;
selecting, with the color endpoint mode estimation circuit, two optimal color endpoint modes and block modes having the least combined errors, among the decimated grids;

encoding a texture map using the selected optimal decimated grids, and forming 128-bit compressed data by packing data of the two optimal color endpoint modes and block modes, a quantized weight, information of a partition pattern, and a color endpoint mode (CEM) configuration corresponding to the data of the two optimal color endpoint modes and the block modes.

17. The method of claim 16, further comprising:

selecting, with a color endpoint and weight refinement circuit, an optimal color endpoint mode and a block mode based on having a minimum reconstruction error among the optimal color endpoint modes and optimal block modes.

18. The method of claim 16, wherein the encoder circuit is an Adaptive Scalable Texture Compression (ASTC) encoder.

* * * * *